(12) United States Patent
Kim

(10) Patent No.: US 10,581,079 B2
(45) Date of Patent: Mar. 3, 2020

(54) POSITIVE ACTIVE MATERIAL COMPOSITION FOR RECHARGEABLE LITHIUM BATTERY AND RECHARGEABLE LITHIUM BATTERY

(71) Applicant: Samsung SDI Co., Ltd., Yongin-si, Gyeonggi-do (KR)

(72) Inventor: Dae-Sik Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 1048 days.

(21) Appl. No.: 13/793,639

(22) Filed: Mar. 11, 2013

(65) Prior Publication Data

US 2014/0141322 A1    May 22, 2014

(30) Foreign Application Priority Data

Nov. 20, 2012    (KR) .......................... 10-2012-0131877

(51) Int. Cl.
*H01M 4/62* (2006.01)

(52) U.S. Cl.
CPC .............. *H01M 4/628* (2013.01); *H01M 4/62* (2013.01)

(58) Field of Classification Search
CPC ...................................................... H01M 4/628
See application file for complete search history.

(56) References Cited

U.S. PATENT DOCUMENTS

| 4,744,916 | A |   | 5/1988 | Adams et al. |
| 4,816,358 | A | * | 3/1989 | Holleck ............... H01M 4/136 429/209 |
| 6,200,703 | B1 |   | 3/2001 | Kashio et al. |
| 7,829,219 | B2 |   | 11/2010 | Yun et al. |
| 2011/0061723 | A1 |   | 3/2011 | Kunimoto et al. |
| 2011/0165459 | A1 |   | 7/2011 | Halalay et al. |

FOREIGN PATENT DOCUMENTS

| JP | 10-208729 |   | 8/1998 |
| JP | 2000-090917 |   | 3/2000 |
| JP | 2009-146871 | A | 7/2009 |
| JP | 2012089411 | A * | 5/2012 |
| KR | 1987-0001301 | A | 3/1987 |
| KR | 1997-0054750 |   | 7/1997 |
| KR | 1020040009332 | A | 1/2004 |
| KR | 1020060073436 | A | 6/2006 |
| KR | 10-0643631 | B1 | 11/2006 |
| KR | 1020070119218 | A | 12/2007 |

OTHER PUBLICATIONS

Walkowiak et al., Macrocycle carriers for separation of metal ions in liquid membrane processes—a review, 2009, Elsevier, Desalination 240, p. 186-197.*
Isshiki et al., JP 2012089411 A—machine translation.*
Office Action dated Jul. 21, 2016, issued in corresponding KR Application No. 10-2012-0131877.

* cited by examiner

*Primary Examiner* — Haixia Zhang
(74) *Attorney, Agent, or Firm* — Knobbe, Martens, Olson & Bear LLP

(57) ABSTRACT

Disclosed is a positive active material composition that includes a positive active material and an additive represented by the following Chemical Formula 1.

L1-A1-L2-A2-L3-A3-(L5-A5)$_n$-L4-A4    [Chemical Formula 1]

In Chemical Formula 1, each substituent is the same as described in the detailed description.

4 Claims, 1 Drawing Sheet

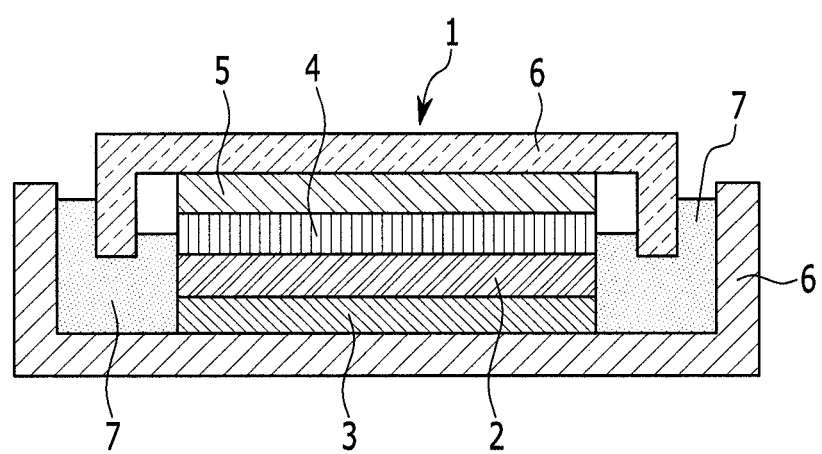

POSITIVE ACTIVE MATERIAL COMPOSITION FOR RECHARGEABLE LITHIUM BATTERY AND RECHARGEABLE LITHIUM BATTERY

CROSS-REFERENCE TO RELATED APPLICATIONS

This application claims priority to and the benefit of Korean Patent Application No. 10-2012-0131877 filed in the Korean Intellectual Property Office on Nov. 20, 2012, the entire contents of which are incorporated herein by reference.

BACKGROUND

Field

A positive active material composition for a rechargeable lithium battery and a rechargeable lithium battery including the same are disclosed.

Description of the Related Technology

There has been a need to develop batteries for the portable electronic equipment that have both high performance and large capacity. Rechargeable lithium batteries include a negative electrode, a positive electrode, and an electrolyte, and generate electrical energy by oxidation and reduction reactions when lithium ions are intercalated/deintercalated in the positive electrode and negative electrode. Such rechargeable lithium batteries use a lithium metal, a carbon-based material, Si, and the like for a negative active material. For a positive active material of rechargeable lithium batteries, metal chalcogenide compounds being capable of intercalating and deintercalating lithium ions, and for example, composite metal oxide such as $LiCoO_2$, $LiMn_2O_4$, $LiNiO_2$, $LiNi_{1-x}Co_xO_2$ (0<X<1), $LiMnO_2$, and the like has been used.

SUMMARY

One embodiment provides a positive active material composition for a rechargeable lithium battery having excellent coating properties.

Another embodiment provides a rechargeable lithium battery including the positive active material composition.

According to one embodiment, provided is a positive active material composition for a rechargeable lithium battery including a positive active material and an additive represented by the following Chemical Formula 1.

L1-A1-L2-A2-L3-A3-(L5-A5)$_n$-L4-A4    Chemical Formula 1

In Chemical Formula 1,

L1, L2, L3, L4, and L5 are the same or different and are a $C_1$ to $C_3$ alkylene group, or oxygen (O), A1, A2, A3, A4, and A5 are the same or different and are a $C_6$ to $C_{16}$ aromatic group or a $C_6$ to $C_{12}$ heterocycloalkyl group, wherein at least one hydrogen of the aromatic group or a $C_6$ to $C_{12}$ heterocycloalkyl group is substituted with a (R)$_p$OH group wherein R is a $C_1$ to $C_5$ alkylene group, and p is an integer from 0 to 4, n is an integer from 0 to 4, provided that when n is 1 to 4, the L5 and A5 are the same or different, and L1 and A4 are linked to each other to form a cyclic ring.

The aromatic group may further include an alkyl group as a substituent.

The additive may be a calixarene derivative, α-cyclodextrin, β-cyclodextrin, γ-cyclodextrin, or a combination thereof.

The calixarene derivative may be represented by the following Chemical Formula 2.

Chemical Formula 2

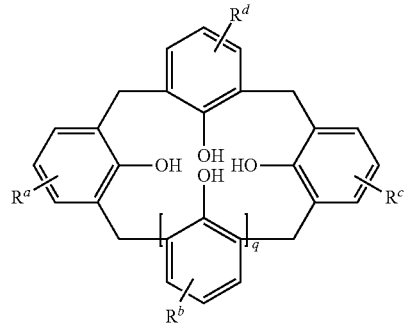

In Chemical Formula 2, $R^a$, $R^b$, $R^c$, and $R^d$ are the same or different and are hydrogen or a $C_1$ to $C_5$ alkyl group, and q is an integer from 1 to 2.

In one embodiment, the additive may be included in an amount of about 0.05 parts by weight to about 5 parts by weight based on 100 parts by weight of the positive active material.

According to another embodiment, provided is a rechargeable lithium battery that includes a positive electrode including the positive active material composition; a negative electrode including a negative active material; and an electrolyte including an organic solvent and a lithium salt.

The positive active material composition according to one embodiment may suppress internal resistance increase due to corrosion of a current collector during the fabrication of an electrode and thus, provide a rechargeable lithium battery having high rate capability and excellent cycle life characteristics.

BRIEF DESCRIPTION OF THE DRAWINGS

FIG. 1 is a schematic view showing the structure of a rechargeable lithium battery according to one embodiment.

DETAILED DESCRIPTION

Example embodiments will hereinafter be described in detail. However, these embodiments are examples, and this disclosure is not limited thereto.

A positive electrode for a rechargeable lithium battery is manufactured by coating an active material slurry including a positive active material, a conductive material, a binder, and a solvent on a current collector followed by drying the resultant. The binder is used to improve adherence among active material particles and between the active material particles and the current collector and to smoothen electron conductivity and in general includes the most widely-used polyvinylidene fluoride. The polyvinylidene fluoride is a polymer consisting of monomers ($CH_2CF_2$) including fluorine (F) having the highest electronegativity among elements of the Periodic Table, and hydrogen (H) having the lowest electronegativity. The monomers have a molecule structure with a large dipole moment.

The positive active material slurry is prepared by dissolving a polyvinylidene binder in a solvent such as N-methylpyrrolidone to prepare a binder solution and adding an active material and a conductive material to the binder solution.

The binder is transformed from a liquid to a solid during a drying process for fabricating a positive electrode and produces adherence among the active material particles or between the current collector and the particles. The polyvinylidene fluoride in the positive active material slurry is transformed into β or γ-polyvinylidene fluoride during the drying process and the resultant has a very large dipole moment, since fluorine in the polyvinylidene fluoride are arranged in one direction. Accordingly, many hydrogen molecule bonds are produced.

This polarity makes protons particularly weak to cations. Herein, if an alkali component such as a hydroxide ion (OH⁻) of LiOH on the surface of a positive active material approaches the polyvinylidene fluoride, hydrogen is bonded with fluorine due to polarity and released as hydrofluoric acid (HF), while carbons losing the protons share electrons and form double bonds These double bonds deform the binder and weaken original adherence of the binder and thus, cause gelation of the slurry. This gelation hinders the slurry from being uniformly coated on the current collector and, if ever, decreases adherence among the active material particles or between the particles and the current collector.

When the active material particles lack of adherence as aforementioned, the particles may be easily detached from the surface of the positive electrode and resultantly deteriorate battery safety. The positive active material particles detached due to insufficient adherence may cause a microshort inside a battery and thus, deteriorate battery performance. If the microshort becomes big, it may cause a short circuit and subsequently a fire.

In addition, when the particles have less adherence to the current collector, the resistance to the electrode movement from the particles to the current collector occurs, thereby decreasing an electron conductivity speed so high rate capability and cycle-life characteristic are deteriorated.

Furthermore, when the slurry is coated, hundreds of micrometer (μm)-thick particles coated on the current collector are stuck to a continually-rolling press roller due to insufficient adherence during the compression and may cause a surface defect or a substrate defect due to the pressure thereon. Accordingly, the insufficient adherence between the particles and the current collector may deteriorate a yield of manufacturing a battery.

According to one embodiment, a positive active material composition is prepared by using an additive represented by the following Chemical Formula 1 in order to solve the problem. Hereinafter, the present embodiments are illustrated in more detail.

The positive active material composition for a rechargeable lithium battery according to one embodiment includes a positive active material and an additive represented by the following Chemical Formula 1.

L1-A1-L2-A2-L3-A3-(L5-A5)$_n$-L4-A4     Chemical Formula 1

In Chemical Formula 1,

L1, L2, L3, L4, and L5 are the same or different and are a $C_1$ to $C_3$ alkylene group, or oxygen (O), A1, A2, A3, A4, and A5 are the same or different and are a $C_6$ to $C_{16}$ aromatic group or a $C_6$ to $C_{12}$ heterocycloalkyl group. At least one hydrogen of the aromatic group or a $C_6$ to $C_{12}$ heterocycloalkyl group is substituted with a $(R)_p$OH group wherein R is a $C_1$ to $C_5$ alkylene group, and p is an integer from 0 to 4.

The aromatic group may further include an alkyl group as a substituent. Herein the alkyl group may have $C_1$ to $C_5$. The alkyl group may be linear or branched.

In Chemical Formula 1, n is an integer from 0 to 4, provided that when n is 1 to 4, the L5 and A5 are the same or different, and L1 and A4 are linked to each other to form a cyclic ring.

The additive may be a calixarene derivative, α-cyclodextrin, β-cyclodextrin, γ-cyclodextrin, or a combination thereof. The calixarene derivative may be represented by the following Chemical Formula 2.

Chemical Formula 2

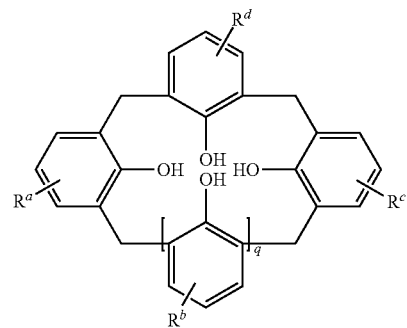

In Chemical Formula 2, $R^a$, $R^b$, $R^c$, and $R^d$ are the same or different and are hydrogen or a C1 to C5 alkyl group, and q is an integer from 1 to 2. The alkyl group may be linear or branched.

In Chemical Formula 2, when q is 1, and $R^a$, $R^b$, $R^c$, and $R^d$ are hydrogen, calix[4]arene is provided, and when q is 1, and $R^a$, $R^b$, $R^c$, and $R^d$ are an alkyl group, for example a t-butyl group, 4-t-butylcalix[4]arene is provided. When q is 2, calix[5]arene is provided, and when q is 3, calix[6]arene is provided.

The α-cyclodextrin, β-cyclodextrin, or γ-cyclodextrin may be represented by the following Chemical Formula 3, 4, or 5.

Chemical Formula 3

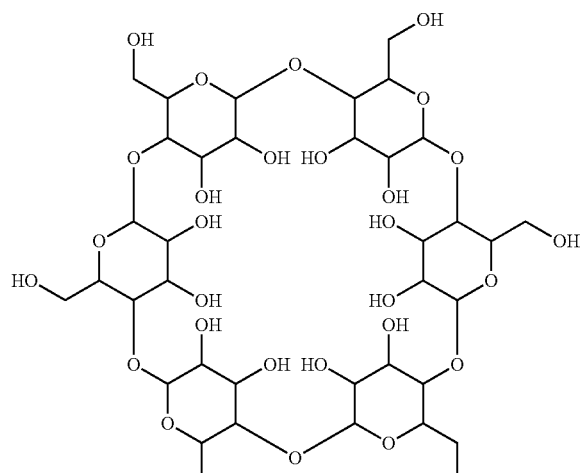

Chemical Formula 4

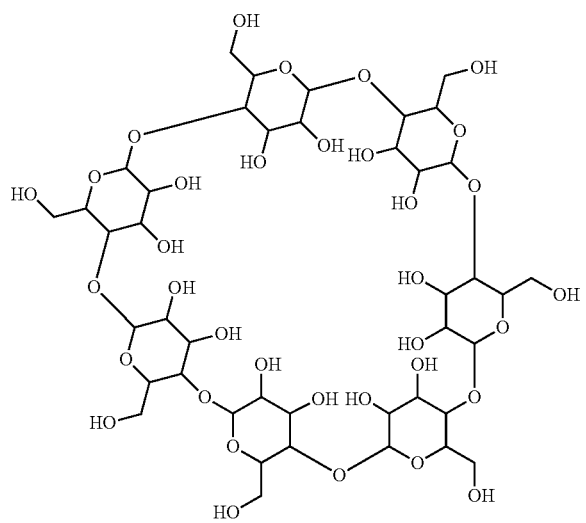

Chemical Formula 5

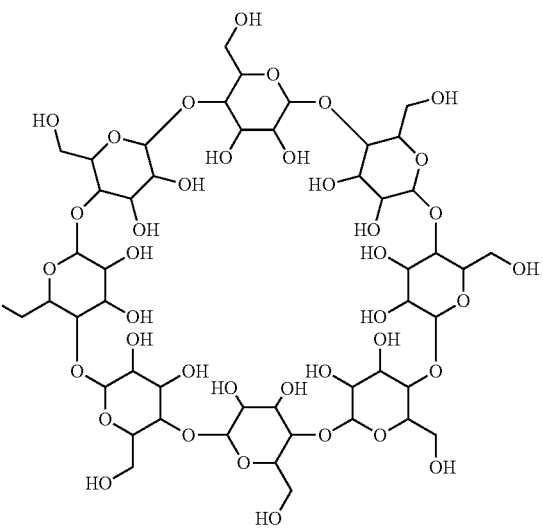

In one embodiment, the additive may be included in an amount of about 0.05 parts by weight to about 5 parts by weight based on 100 parts by weight of the positive active material. Out of the above range, capacity may be reduced and resistance may be increased.

The additive has hydrophobic cavity (when it is described with Chemical Formula, as one example, an arrow part in the following Chemical Formula 5 is illustrated as the following structure 1 and the an empty space in the structure 1 refers to the hydrophobic space) and prevents the surface of the active material from contacting moisture in the air and thus, pH increase of the active material and gelation of the active material through interaction with hydroxide ion ($OH^-$) from four OH's. In other words, when a positive electrode is fabricated under high humidity, the additive is added to the positive active material to solve a gelation problem due to pH increase of a positive active material, particularly, a nickel-cobalt-based positive active material by suppressing gelation of the positive active material due to the moisture.

Chemical Formula 5

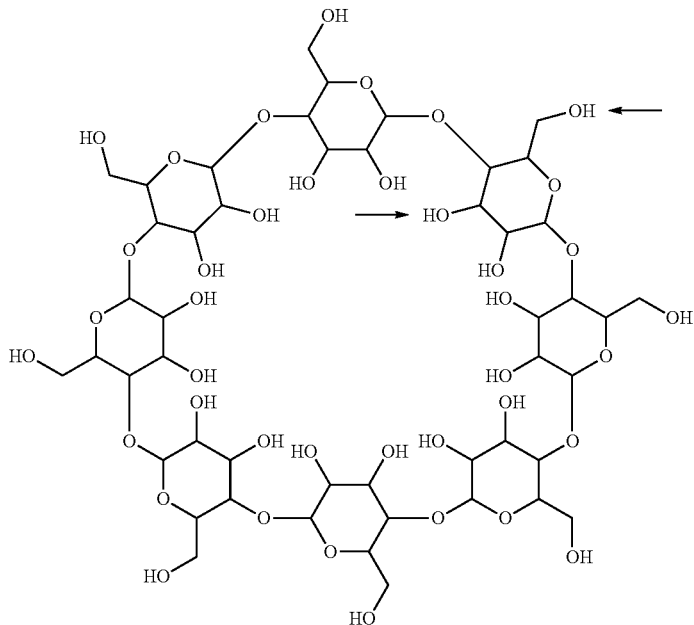

-continued

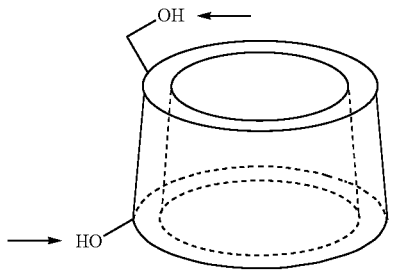

Structure 1

The positive active material is a compound that reversibly intercalates and deintercalates lithium ions, and may be any compound that may be used as a positive active material of a rechargeable lithium battery. The positive active material may include a composite oxide including at least one selected from the group consisting of cobalt, manganese, and nickel, as well as lithium.

Specific examples may be the compounds represented by the following chemical formulae. $Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0≤b≤0.5, 0≤c≤0.05); $Li_aE_{2-b}X_bO_{4-c}D_c$ (0≤b≤0.5, 0≤c≤0.05); $Li_aNi_{1-b-c}Co_bX_cD_\alpha$ (0.90≤a≤1.8, 0≤b≤0.5, 0≤c≤0.5, 0<α≤2); $Li_aNi_{1-b-c}Co_bX_cO_{2-\alpha}T_\alpha$ (0.90≤a≤1.8, 0≤b≤0.5, 0≤c≤0.05, 0<α<2); $Li_aNi_{1-b-c}Co_bX_cO_{2-\alpha}T_2$ (0.90≤a≤1.8, 0≤b≤0.5, 0≤c≤0.05, 0<α<2); $Li_aNi_{1-b-c}Mn_bX_cD_\alpha$ (0.90≤a≤1.8, 0≤b≤0.5, 0≤c≤0.05, 0<α≤2); $Li_aNi_{1-b-c}Mn_bX_cO_{2-\alpha}T_\alpha$ (0.90≤a≤1.8, 0≤b≤0.5, 0≤c≤0.05, 0<α<2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCo_{1-b}G_bO_2$ (0.90≤a≤1.8, 0≤b≤0.1); $Li_aMn_{1-b}G_bO_2$ (0.90≤a≤1.8, 0≤b≤0.1); $Li_aMn_{2-b}G_bO_4$ (0.90≤a≤1.8, 0≤b≤0.1); $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMnG_bO_4$ (0.90≤a≤1.8, 0.001≤b≤0.1); $Li_aMn_{1-g}G_gPO_4$ (0.90≤a≤1.8, 0≤g≤0.5); $QO_2$; $QS_2$; $LiQS_2$; $V_2O_5$; $LiV_2O_5$; $LiZO_2$; $LiNiVO_4$; $Li_{(3-f)}J_2(PO_4)_3$ (0≤f≤2); $Li(3-f)Fe_2(PO_4)_3$ (0≤f≤2); $Li_aFePO_4$ (0.90≤a≤1.8).

In the above chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The positive active material may be a compound with the coating layer on the surface or a mixture of the active material and a compound with the coating layer thereon. The coating layer may include at least one coating element compound selected from the group consisting of an oxide of the coating element, a hydroxide of the coating element, an oxyhydroxide of the coating element, an oxycarbonate of the coating element, and a hydroxycarbonate of the coating element. The compound for the coating layer may be either amorphous or crystalline. The coating element included in the coating layer may be Mg, Al, Co, K, Na, Ca, Si, Ti, V, Sn, Ge, Ga, B, As, Zr, or a mixture thereof. The coating process may include any conventional processes unless it causes any side effects on the properties of the positive active material (e.g., spray coating, immersing), which is well known to those who have ordinary skill in this art and will not be illustrated in detail.

The binder improves binding properties of the positive active material particles to one another and to a current collector. Examples of the binder include at least one selected from polyvinyl alcohol, carboxylmethylcellulose, hydroxypropylcellulose, diacetylcellulose, polyvinyl chloride, carboxylated polyvinyl chloride, polyvinyl fluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like but are not limited thereto.

The positive active material composition may further include a conductive material. The conductive material improves electrical conductivity of a positive electrode. Any electrically conductive material can be used as a conductive agent unless it causes a chemical change. Examples of the conductive material include at least one selected from a carbon-based material such as natural graphite, artificial graphite, carbon black, acetylene black, ketjen black, a carbon fiber, and the like; a metal-based material of a metal powder or a metal fiber including material copper, nickel, aluminum, silver, and the like; a conductive material such as a polyphenylene derivative and the like; or a mixture thereof.

The positive electrode may be manufactured by coating a positive active material slurry including a positive active material, an additive, a conductive material, and a binder in a solvent, on a current collector. The solvent may be N-methylpyrrolidone.

In the mixing process, a binder may be first added to a solvent to prepare a binder solution, and an active material and an conductive material may be added to the binder solution, but mixing orders may be adjusted appropriately. The electrode manufacturing method is well known and thus, is not described in detail in the present specification.

According to another embodiment, a rechargeable lithium battery includes a positive electrode including the positive active material composition; a negative electrode including a negative active material; and an electrolyte solution.

The positive electrode includes a current collector and a positive active material layer including the positive active material composition formed on the current collector.

The current collector may be Al.

The positive active material layer may include about 90 wt % to about 98 wt % of the positive active material based on the total weight of the positive active material layer. The binder and conductive material may be included in each amount of about 1 wt % to about 5 wt % based on the total weight of the positive active material layer.

The negative electrode includes a current collector and a negative active material layer disposed on the current collector, and the negative active material layer includes a negative active material.

The negative active material includes a material that reversibly intercalates/deintercalates lithium ions, a lithium metal, a lithium metal alloy, a material being capable of doping/dedoping lithium, or a transition metal oxide.

The material that can reversibly intercalate/deintercalate lithium ions includes a carbon material. The carbon material may be any generally-used carbon-based negative active material in a lithium ion rechargeable battery. Examples of the carbon material include crystalline carbon, amorphous carbon, and mixtures thereof. The crystalline carbon may be non-shaped, or sheet, flake, spherical, or fiber shaped natural graphite or artificial graphite. The amorphous carbon may be a soft carbon, a hard carbon, a mesophase pitch carbonization product, fired coke, and the like.

Examples of the lithium metal alloy include lithium and an element selected from Na, K, Rb, Cs, Fr, Be, Mg, Ca, Sr, Si, Sb, Pb, In, Zn, Ba, Ra, Ge, Al, and Sn.

The material being capable of doping/dedoping lithium may include Si, a Si—C composite, $SiO_x$ (0<x<2), a Si-Q alloy (wherein Q is an element selected from an alkali metal, an alkaline-earth metal, a Group 13 element, a Group 14 element, a Group 15 element, a Group 16 element, a transition element, a rare earth element, and a combination thereof, and not Si), Sn, $SnO_2$, a Sn—R alloy (wherein R is an element selected from an alkali metal, an alkaline-earth metal, a Group 13 element, a Group 14 element, a Group 15 element, a Group 16 element, a transition element, a rare earth element, and a combination thereof, and not Sn), and the like. At least one of these materials may be mixed with $SiO_2$. The elements Q and R may be selected from Fe, Ni, Mg, Ca, Sr, Ba, Ra, Sc, Y, Ti, Zr, Hf, Rf, V, Nb, Ta, Db, Cr, Mo, W, Sg, Tc, Re, Rh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The transition metal oxide includes vanadium oxide, lithium vanadium oxide, and the like.

In the negative active material layer, the negative active material may be included in an amount of about 95 wt % to about 99 wt % based on the total weight of the negative active material layer.

The negative active material layer may include a binder, and optionally a conductive material. The negative active material layer may include about 1 wt % to about 5 wt % of a binder based on the total weight of the negative active material layer. When the negative active material layer includes a conductive material, the negative active material layer includes about 90 wt % to about 98 wt % of the negative active material, about 1 wt % to about 5 wt % of the binder, and about 1 wt % to about 5 wt % of the conductive material.

The binder improves binding properties of negative active material particles with one another and with a current collector. The binder includes a non-water-soluble binder, a water-soluble binder, or a combination thereof.

The non-water-soluble binder includes polyvinyl chloride, carboxylated polyvinyl chloride, polyvinyl fluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder includes a styrene-butadiene rubber, an acrylated styrene-butadiene rubber, polyvinyl alcohol, sodium polyacrylate, a copolymer of propylene and a $C_2$ to $C_8$ olefin, a copolymer of (meth)acrylic acid and (meth)acrylic acid alkyl ester, or a combination thereof.

When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkali metal salts thereof. The alkali metal may be Na, K, or Li. The cellulose-based compound may be included in an amount of about 0.1 parts to about 3 parts by weight based on 100 parts by weight of the binder.

The conductive material is included to provide electrode conductivity. Any electrically conductive material may be used as a conductive material unless it causes a chemical change. Examples of the conductive material include carbon-based materials such as natural graphite, artificial graphite, carbon black, acetylene black, ketjen black, carbon fibers, and the like; metal-based materials of metal powder or metal fiber including copper, nickel, aluminum, silver, and the like; conductive polymers such as polyphenylene derivatives; or a mixture thereof.

The current collector may include one selected from a copper foil, a nickel foil, a stainless steel foil, a titanium foil, a nickel foam, a copper foam, a polymer substrate coated with a conductive metal, and a combination thereof, but is not limited thereto.

The negative electrode may be manufactured in a method of preparing a negative active material composition by mixing the negative active material, a binder, and optionally, a conductive material in a solvent and coating the composition on a current collector. In the mixing process, a binder may be first added to a solvent to prepare a binder solution, and an active material and a conductive material may be added to the binder solution, but mixing orders may be adjusted appropriately. The electrode manufacturing method is well known and thus, is not described in detail in the present specification. The solvent includes N-methylpyrrolidone and the like but is not limited thereto. When the negative electrode includes a water-soluble binder, water may be used as a solvent during preparation of a negative active material composition.

The electrolyte may include an organic solvent and a lithium salt.

The organic solvent plays a role of transmitting ions taking part in the electrochemical reaction of a battery.

The organic solvent may include a carbonate-based, ester-based, ether-based, ketone-based, alcohol-based, or aprotic solvent. The carbonate-based solvent may include dimethylcarbonate (DMC), diethylcarbonate (DEC), dipropylcarbonate (DPC), methylpropylcarbonate (MPC), ethylpropylcarbonate (EPC), ethylmethylcarbonate (EMC), ethylenecarbonate (EC), propylenecarbonate (PC), butylenecarbonate (BC), and the like. The ester-based solvent may include methyl acetate, ethyl acetate, n-propyl acetate, dimethylacetate, methylpropinonate, ethylpropinonate, γ-butyrolactone, decanolide, valerolactone, mevalonolactone, caprolactone, and the like. The ether-based solvent may include dimethyl ether, dibutyl ether, tetraglyme, diglyme, dimethoxyethane, 2-methyltetrahydrofuran, tetrahydrofuran (THF), and the like. The ketone-based solvent may include cyclohexanone, and the like. The alcohol-based solvent may include ethanol, isopropylalcohol, and the like. The aprotic solvent include nitriles such as R—CN (wherein R is a C2 to C20 linear, branched, or cyclic hydrocarbon group, and may include one or more double bonds, one or more aromatic rings, or one or more ether bonds), amides such as dimethylformamide, dimethylacetamide, dioxolanes such as 1,3-dioxolane, sulfolanes, and the like.

The organic solvent may be used singularly or in a mixture. When the organic solvent is used in a mixture, its mixture ratio can be controlled in accordance with desirable performance of a battery.

The carbonate-based solvent may include a mixture of a cyclic carbonate and a linear carbonate. The cyclic carbonate and the linear carbonate are mixed together in a volume ratio of about 1:1 to about 1:9 as an electrolyte, the electrolyte may have enhanced performance.

In addition, the electrolyte of the present embodiments may be prepared by further adding the aromatic hydrocarbon-based solvent to the carbonate-based solvent. The carbonate-based solvent and the aromatic hydrocarbon-based solvent are mixed together in a volume ratio of about 1:1 to about 30:1.

The aromatic hydrocarbon-based organic solvent may be represented by the following Chemical Formula 6.

Chemical Formula 6

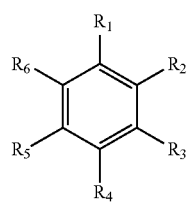

In Chemical Formula 6, $R_1$ to $R_6$ are the same or different and are selected from hydrogen, a halogen, a $C_1$ to $C_{10}$ alkyl group, a $C_1$ to $C_{10}$ haloalkyl group, and a combination thereof.

The aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate-based compound represented by the following Chemical Formula 7 in order to improve cycle-life of a battery.

Chemical Formula 7

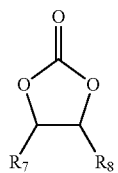

In Chemical Formula 7, $R_7$ and $R_8$ are the same or different and are selected from hydrogen, a halogen, a cyano (CN), a nitro ($NO_2$), and a $C_1$ to $C_5$ fluoroalkyl group, provided that at least one of $R_7$ and $R_8$ is a halogen, a cyano (CN), a nitro ($NO_2$), and a $C_1$ to $C_5$ fluoroalkyl group, and $R_7$ and $R_8$ are not simultaneously hydrogen.

The ethylene carbonate-based compound may include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of such an additive for improving cycle life may be flexibly used within an appropriate range.

The lithium salt is dissolved in an organic solvent, supplies a battery with lithium ions, basically operates the rechargeable lithium battery, and improves transportation of the lithium ions between positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(CyF_{2y+1}SO_2)$ (where x and y are natural numbers), LiCl, LiI, and $LiB(C_2O_4)_2$ (lithium bis(oxalato) borate; LiBOB). The lithium salt may be used in a concentration from about 0.1 M to about 2.0 M. When the lithium salt is included at the above concentration range, an electrolyte may have optimal electrolyte conductivity and viscosity, and may thus have enhanced performance and effective lithium ion mobility.

A separator may be disposed between the positive electrode and negative electrode depending on a kind of a rechargeable lithium battery. Such a separator may use polyethylene, polypropylene, polyvinylidene fluoride or a multilayer of more than two thereof, for example a mixed multilayer such as a polyethylene/polypropylene double layered separator, a polyethylene/polypropylene/polyethylene triple layered separator, polypropylene/polyethylene/polypropylene triple layered separator, and the like.

FIG. 1 is a schematic view showing the representative structure of a rechargeable lithium battery according to one embodiment. FIG. 1 shows a coin-type rechargeable lithium battery, but the present embodiments are not limited thereto. That is to say, any battery such as a coin-type, cylindrical, prismatic battery may be included. As shown in FIG. 1, the rechargeable lithium battery 1 includes a positive electrode 3, a negative electrode 4, and a separator 2 interposed between the positive electrode 3 and negative electrode 4. The rechargeable lithium battery 1 includes a spacer 5 disposed out of the negative electrode 4, a gasket 7 insulating the positive electrode 3 and negative electrode 4, and a battery case 6 including such constituent elements.

The following examples illustrate the present embodiments in more detail. These examples, however, should not in any sense be interpreted as limiting the scope of the present embodiments.

Example 1

A positive active material slurry was prepared by adding a polyvinylidene fluoride binder to an N-methylpyrrolidone solvent to prepare a binder solution and then, adding 30 g of a $LiNi_{0.84}Co_{0.5}Al_{0.01}O_2$ (Ecopro Co., Ltd., NCA020) positive active material, 0.63 g of a denka black conductive material, and a calixarene derivative represented by the following formula 2a to the binder solution. Herein, the positive active material, the conductive material, and the binder were respectively used in each amount of 96 wt %, 2 wt %, and 2 wt %. In addition, the calixarene derivative was used in an amount of 0.05 parts by weight based on 100 parts by weight of the positive active material.

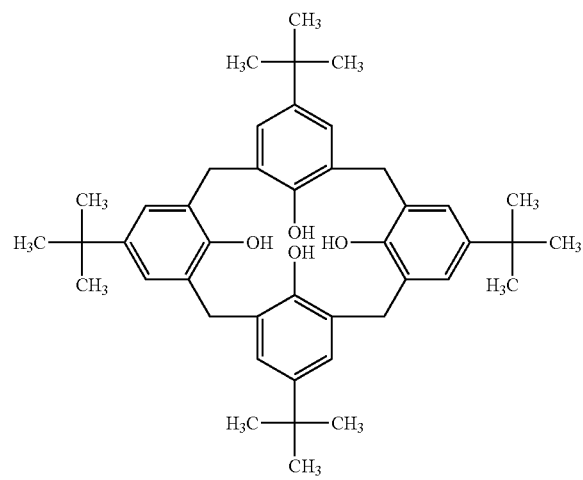 [SMILES: CC(C)(C)c1cc2c(O)c(c1)Cc1cc(C(C)(C)C)cc(c1O)Cc1cc(C(C)(C)C)cc(c1O)Cc1cc(C(C)(C)C)cc(c1O)C2]

Chemical Formula 2a

Example 2

A positive active material slurry was prepared according to the same method as Example 1 except for using 0.05 parts by weight of α-cyclodextrin instead of the calixarene derivative based on 100 parts by weight of the positive active material.

Comparative Example 1

A positive active material slurry was prepared according to the same method as Example 1 except for adding no calixarene derivative.

Experimental Example 1

Gelation Time

The positive active material slurries according to Examples 1 and 2 and Comparative Example 1 were allowed to stand at 22° C. and relative humidity of 50% and measured regarding gelation time. The gelation time is provided in the following Table 1.

TABLE 1

|  | Gelation time (day) |
| --- | --- |
| Example 1 | 6 days |
| Example 2 | 5.5 days |
| Comparative Example 1 | 1.5 days |

As shown in Table 1, the positive active material slurries according to Examples 1 and 2 took longer time for gelation than the one according to Comparative Example 1 and thus, maintained excellent adherence and secure stability of a battery manufacturing process.

Experimental Example 2

Discharge Capacity

The positive active material slurries according to Examples 1 and 2 and Comparative Example 1 were used to fabricate a positive electrode in a conventional method of coating slurry on a 15 μm-thick Al foil current collector, drying it in a 120° C. vacuum oven, and compressing it. Then, a negative electrode fabricated by coating a negative active material (graphite, KPT) on a 8 μm-thick copper current collector and a separator (thickness: 18 μm, polyethylene, Asahi A1) were used with the positive electrode, fabricating a full cell.

Herein, an electrolyte solution was prepared by using a mixed solvent of ethylene carbonate and ethylmethyl carbonate in a volume ratio of 3:7 and dissolving 1.15M of $LiPF_6$ therein.

As for the coin-type full cells, 0.1 C/0.1 C formation charge and discharge were twice performed, and then, 0.2 C/0.2 C standard charge and discharge was once performed. Herein, the cells had a charge-ending voltage of 4.2V (Li/graphite) and a discharge-ending voltage of 3.0V (Li/graphite). The cells were measured regarding discharge capacity at the 0.2 C charge/discharge. Then, a difference between 0.2 C discharge capacities of the cells according to Examples 1 and 2 and the 0.2 C discharge capacity of the cell according to Comparative Example 1 were calculated and provided in the following Table 2.

TABLE 2

| | Active material | Additive | 0.2 C charge and discharge (mAh/g) | Discharge capacity difference (mAh/g) |
|---|---|---|---|---|
| Example 1 | Ecopro Co., Ltd. NCA020 | 0.05 wt % | 185.1 | −1.2 |
| Example 2 | Ecopro Co., Ltd. NCA020 | 0.05 wt % | 184.2 | −2.4 |
| Comparative Example 1 | Ecopro Co., Ltd. NCA020 | | 186.3 | |

As shown in Table 2, the cells according to Examples 1 and 2 had similar charge and discharge capacity to that of the cell according to Comparative Example 1.

Therefore, since the cells according to Examples 1 and 2 maintained charge and discharge capacity and a longer gelation time referring to the results of Tables 1 and 2, Examples 1 and 2 turned out to well maintain safety during the preparation of the positive slurry and long-term storage characteristic of the slurry and thus, improve its manufacturing process.

While this disclosure has been described in connection with what is presently considered to be practical example embodiments, it is to be understood that the present embodiments are not limited to the disclosed embodiments, but, on the contrary, is intended to cover various modifications and equivalent arrangements included within the spirit and scope of the appended claims.

What is claimed is:

1. A positive active material composition for a rechargeable battery consisting of
   a positive active material; an additive;
   a conductive material;
   a binder selected from the group consisting of polyvinyl alcohol, polyvinyl chloride, carboxylated polyvinyl chloride, polyvinyl fluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, or an epoxy resin;
   wherein the additive is a calixarene derivative represented by the following Chemical Formula 2

[Chemical Formula 2]

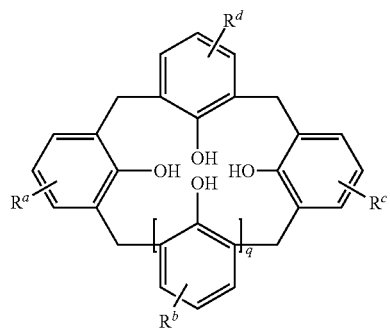

wherein,
$R^a$, $R^b$, $R^c$, and $R^d$ are the same or different and are hydrogen or a $C_1$ to $C_5$ alkyl group, and q is an integer from 1 to 2, and
wherein the additive is included in an amount of 0.05 parts by weight to 5 parts by weight based on 100 parts by weight of the positive active material.

2. The positive active material composition of claim 1, wherein the calixarene derivative is represented by the following Chemical Formula 2a

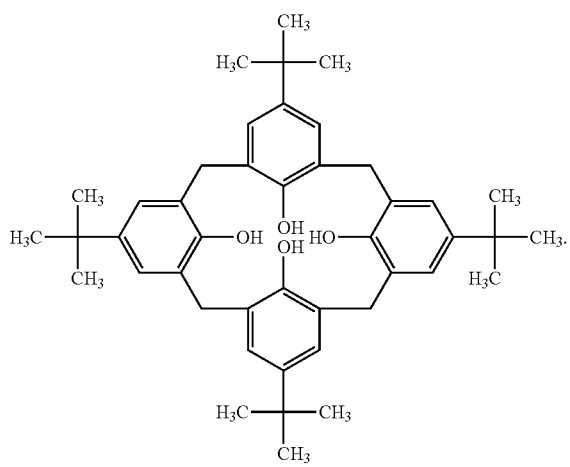 [SMILES: CC(C)(C)c1cc2c(O)c(c1)Cc1cc(C(C)(C)C)cc(c1O)Cc1cc(C(C)(C)C)cc(c1O)Cc1cc(C(C)(C)C)cc(c1O)C2]

3. A rechargeable lithium battery, comprising
   a positive electrode including a positive active material composition consisting of a positive active material, an additive, a conductive material, a binder selected from the group consisting of polyvinyl alcohol, polyvinyl chloride, carboxylated polyvinyl chloride, polyvinyl fluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, or an epoxy resin;
   a negative electrode including a negative active material;
   an electrolyte including an organic solvent and a lithium salt;
   wherein the additive is a calixarene derivative represented by the following Chemical Formula 2

[Chemical Formula 2]

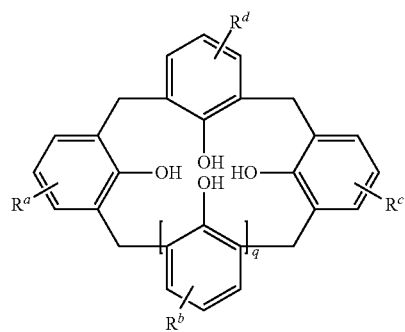

wherein, $R^a$, $R^b$, $R^c$, and $R^d$ are the same or different and are hydrogen or a $C_1$ to $C_5$ alkyl group, and q is an integer from 1 to 2; and wherein the additive is included in an amount of 0.05 parts by weight to 5 parts by weight based on 100 parts by weight of the positive active material.

4. The rechargeable lithium battery of claim 3, wherein the calixarene derivative is represented by the following Chemical Formula 2a

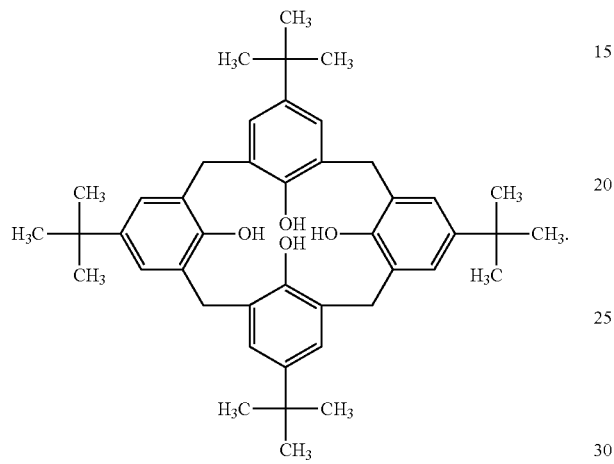

* * * * *